United States Patent Office 3,354,015
Patented Nov. 21, 1967

3,354,015
METHOD OF PROTECTING POLISHED METAL SURFACES
Galen J. Klusmire, Midland, Mich., William H. Borough, Downey, Calif., and Jacob Eichhorn, Midland, Mich., assignors to The Dow Chemical Company, Midland, Mich., a corporation of Delaware
Filed Aug. 14, 1964, Ser. No. 389,733
6 Claims. (Cl. 156—306)

This invention relates to the protection of polished metal surfaces, and more particularly, to a process for temporarily protecting polished metal surfaces with an easily removable, protective layer of certain synthetic, resinous, flexible, sheet materials which are essentially electrically neutral with respect to the polished metal surface being protected.

This application is a continuation-in-part of application Ser. No. 325,001, filed Nov. 20, 1963.

The term "sheet" is used herein to designate coatings, film and sheet-like structures having a thickness of up to about 1/10 of an inch.

The term "chloroethylene polymers" is used herein to designate those thermoplastic polymers having chlorine pendant from the carbon chain, such as the polymers and copolymers of vinylidene chloride and vinyl chloride.

The term "normally crystalline vinylidene chloride polymer" is used herein to designate those polymers and interpolymers composed of at least predominant amounts of vinylidene chloride and lesser amounts of one or more copolymerizable monoethylenically unsaturated compounds.

The problem of protecting polished or finished metal surfaces has greatly increased in recent years with extensive use of stamping and bending of pre-plated sheet metallic stock used in the sheet metal fabrication of household appliances and the like. In such fabrication process it is highly desirable that any protective coating is applied continuously to a plated or finished surface, and is readily removable therefrom without resort to special tools, solvents or the like.

Prior known methods for protecting polished or plated metallic surfaces include the spraying of suspensions of rubbery synthetic resins or asphaltic products, and allowing the carrier to evaporate, whereby a layer of the protective substance is deposited upon the finished surface. Such method, however, requires sufficient time for spraying of the surface and for drying of the carrier prior to performing shaping operations upon the protected material. Further, such protective coatings generally require the use of solvents and/or abrasion for removal from the metallic surface.

Another method comprises dipping of the surface to be protected into such substances as synthetic latex, vinyl aromatic hydrocarbons, ethyl cellulose, polyvinyl alcohol and shellac. It has been found, however, that all of the above methods require substantial time in application and subsequent removal.

Still another method contemplates the coating or covering of the polished metal surface with gummed or pressure sensitive adhesive tape. The principal difficulties encountered with such materials are the prohibitive high cost and the tendency to leave a deposit of adhesive upon the protected surface following removal of the protective tape.

Yet another method comprises the extrusion of relatively high molecular weight hydrocarbon polymers such as polyethylene and the like, at high temperatures, directly onto the substrate surface to be protected and thereafter immediately combining the substrate and polymer coating by pressure. Such methods, however, generally provide variable bonding with accompanying formation of undesirable discontinuous coatings.

In an attempt to avoid the above difficulties, use has been made of certain synthetic, resinous sheeting material, to which has been applied, and which is capable of retaining, and electrostatic charge, as the protective coating or covering for the polished metallic surfaces. In such process (as described in the U.S. Patent No. 3,054,708, issued Sept. 18, 1962), the electrostatic charge is placed upon the sheeting or film prior to its subsequent application upon the finished metallic surface or simultaneously with its application to such surface. The major difficulty encountered herein is the necessity for the application of such electrostatic charge to the protective material which is, at best, difficultly applied in a uniform manner under varying atmospheric conditions.

It is, therefore, an object of this invention to provide an improved method of applying a protective material to a polished metallic surface in which the use of an adhesive or an electrostatic charge has been completely eliminated.

Another object is the provision for utilizing a synthetic, resinous, flexible sheet material capable of adhering uniformly to a metallic surface, but which may be readily removed therefrom without difficulty and without resort to other than ordinary skill.

Other and related objects may become apparent from the following description and claims, and the annexed drawings.

In the drawings, to which reference will be made in the specification, similar reference characters have been employed to designate corresponding parts throughout the several views.

In accordance with the present invention, polished or finished metal surfaces are effectively and efficiently protected by contacting the same with a continuous, and continuously adherent layer of certain synthetic, resinous, flexible sheet material which is essentially electrically neutral with respect to the finished metallic surface being protected, while utilizing pressures sufficient to remove essentially all of the air from between the protective sheet material and the metallic surface being protected. The protective sheet material, as hereinafter more fully defined, may thereafter be removed when desired without difficulty and without resort to special equipment or other than ordinary skill.

The chloroethylene polymers, such as the polymers and copolymers of vinylidene chloride and vinyl chloride, have been found to be particularly useful for temporarily protecting finished metal surfaces, due to their ease of processability, good inherent bonding characteristics, toughness and abrasion resistance and ability to be easily removed from the metal surface when desired. Exemplary of other protective sheet materials found to be of use for the purposes of the present invention are copolymers of ethylene and acrylic acid, as hereinafter more fully defined, as well as essentially similar copolymers of ethylene and vinyl acetate, and copolymers of ethylene and the lower acrylates, such as ethacrylate.

Figure 1:
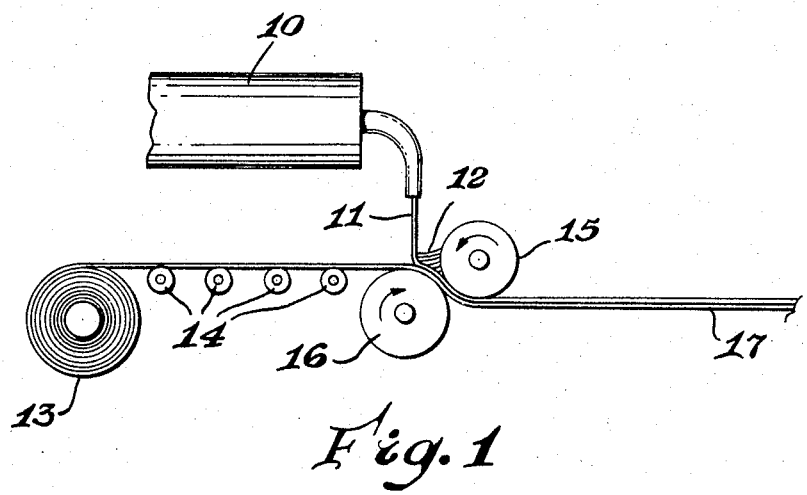
FIGURE 1 is a schematic view showing an embodiment of the invention.

Referring to FIGURE 1 in the drawings, there is shown a typical installation for the application of molten chloroethylene polymer indicated by reference character 11 from an extruder 10 to a roll of sheet metal indicated by the reference character 13, the outer surface, at least, of which has been plated or otherwise finished. The metal is advantageously moved over a plurality of horizontally disposed rollers 14 which support the metal in a plane. The protective flexible sheet material is melted continuously and fed to the upper surface of the metal at a rate substantially equal to the rate at which it is used to coat or cover the metallic surface to be protected, at the nip of a pair of pressure rolls 15 and 16 over one of which 16 the sheet metal is drawn. The roll speed is adjusted so that the rate of take-away of the polymer on the metallic sheet nearly balances the rate of feed from the extruder. It is preferred in such process that there be no more than a minimum inventory of molten polymer at any point in the system. After emerging from the extruder, the polymer should not remain molten for over an additional two minutes, and even shorter exposures to melting temperatures are preferred. In recognition of the inevitable momentary variation in the rate of dispersion of polymer from the extruder, a small reservoir of polymer 12 is carried in the nip of the pressure rolls 15 and 16, respectively, but this amount is generally limited to a quantity which would only last for about ⅓ of a minute to one minute if the extruder were to cease functioning.

The pressure rolls 15 and 16 are spaced apart a distance just sufficient to permit passage of the protected metal sheet 17 having the desired thickness of polymer thereon. Such rolls serve as coating, doctor and pressure rolls to smoothe the protective layer applied to the sheet metal surface and to remove essentially all of the air between the protective layer and the protected metal surface, thereby greatly enhancing the bond therebetween. To prevent the molten polymer 11 from sticking to the roll 15 with which it is directly in contact, this roll is often advantageously maintained at a temperature below the melting point of the polymer, while the roll 16 against which the sheet metal is fed is maintained nearer the polymer melting point.

In another embodiment of the invention, similar good results are obtained by the application of a flexible, essentially amorphous preformed sheet material 19, as herein defined, to the finished metal surface to be protected. In this regard, and referring to FIGURE 2 in the drawings, there is shown a typical installation for the application of such material 19 to a roll of sheet metal 13 in a manner similar to that described above, with the exception that the protective sheet material 19 is extruded through a flat film die 18 prior to application to the surface of the sheet metal. The protective sheet material is subsequently applied to the sheet metal surface 13 at the nip of the pressure rolls 15 and 16 essentially as described herein. It has been found, however, that the temperatures of the pressure rolls 15 and 16 may be varied widely as the flexible, pre-formed, sheet-like protective materials have considerably less tendency to stick to the roll 15 as compared to molten sheet materials.

Figure 3:
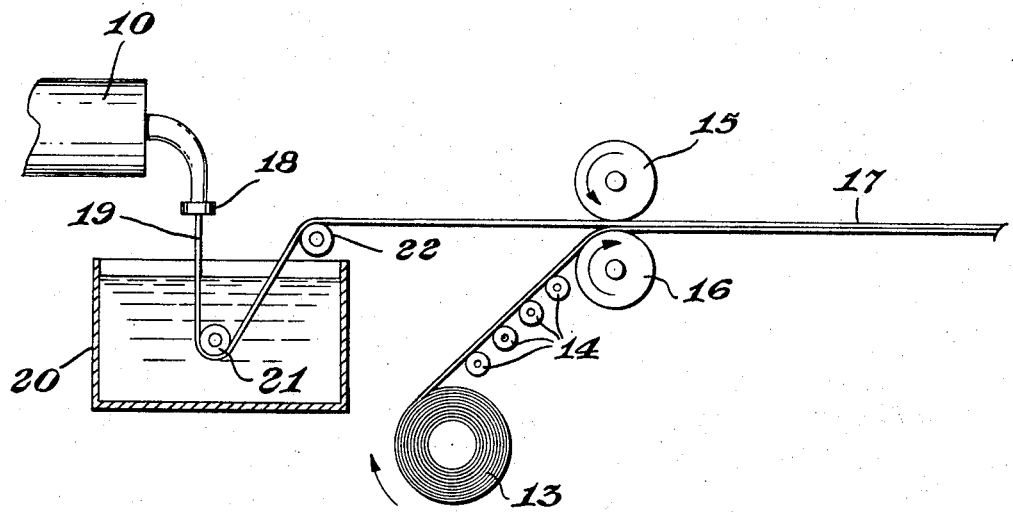
FIGURE 3 is a schematic view showing another alternate form of the embodiment.
Figure 4:
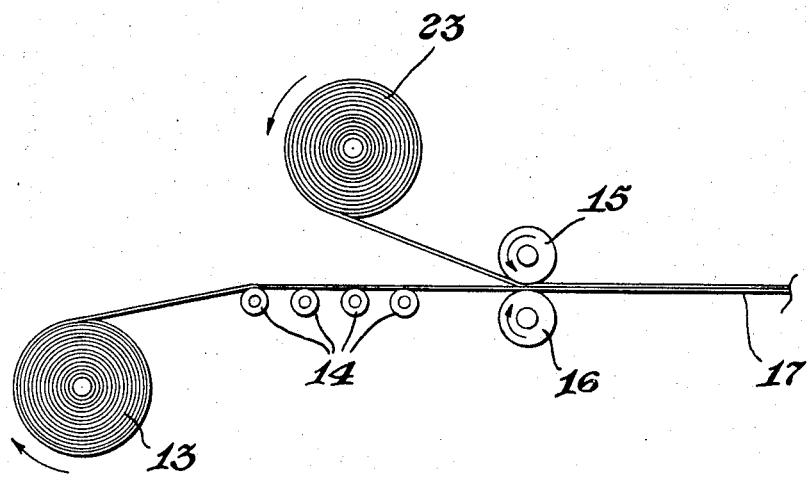
FIGURE 4 is a schematic view showing yet another alternate form of the embodiment.

Yet another embodiment of this invention is illustrated in FIGURE 3 of the drawings, wherein there is shown a typical installation for the application of a synthetic, resinous, essentially amorphous, normally crystalline sheet material to sheet metal surface by extrusion of such readily crystallizable sheet material 19 through a flat film die 18 downwardly into a cooling bath 20 maintained at a temperature within the range wherein the extruded readily crystallizable sheet material 19 is quickly supercooled without substantial crystallization. Immersed within the water bath 20 is a driven roll 21 by which the extruded sheet 19 is drawn from the flat film die 18. The supercooled sheet 19 is elevated from the water bath 20 over a roll 22 at the nip of the pressure rolls 15 and 16, essentially as hereinbefore described, to form the protected metal sheet 17.

In order to obtain the most desirable properties in the protective layer of the embodiments described herein, it has been found to be generally undesirable to permit those normally crystalline polymeric materials when applied as essentially amorphous materials, to reaquire their crystalline condition by a normal aging process at ordinary temperatures. Recrystallization by normal aging is generally not uniform throughout the polymeric body, and the product may continue to change properties as crystallization progresses over a protracted period of time. Furthermore, essentially non-crystalline polymers may be tacky, and if the protected sheet material is wound on a storage roll, the protected surface of the sheet metal may block against an unprotected face or surface of the sheet metal which is placed against it. Hence, following application of the protected material to the finished metallic surface, the protected metal sheet is generally advantageously conveyed through a heating zone, such as an oven, in which the amorphous polymer is subjected to a temperature known to induce accelerated recrystallization of the polymer.

In still another embodiment of the invention, similar good results are obtained by the application of a flexible, oriented film of a crystalline vinylidene chloride polymer 23 to a roll of sheet metal 13, the outer surface, at least, of which has been plated or otherwise finished. The metal is moved over a plurality of horizontally disposed rollers 14 which support the metal in a plane. A roll of protective sheet material, as described herein, is supported above the surface of the metal at the nip of rollers 15 and 16 under a pressure sufficient to eliminate essentially all of the air from between the protective sheet material and the surface of the metal to be protected.

After application by any of those methods as herein described, the laminated metal and protective sheet 17 may be fed to a take-up roll wherein the metal is again repackaged for shipment and subsequent use. The protective material of the present invention will adhere very effectively to the metal surface even during those processing operations requiring deep-drawing and sharp bending; such adhesion resulting from the exclusion of essentially all of the air between the protective sheet and the metal surface to be protected. Upon completion of the herein described operations, it is necessary only to manually strip the protective material from the protected surface. As no adhesive has been employed during the application of the protective material, the protected surface will, upon removal of such protective material, exhibit a clean, unmarred appearance requiring no further treatment.

The following specific examples serve to illustrate the effectiveness and advantage of this invention, but are not to be construed as limiting its scope.

*Example 1*

The following results were obtained using apparatus essentially as illustrated in FIGURE 3 of the drawings.

A sheet of polished chrome-plated steel .019 inch thick and nine inches wide was fed continuously through the nip of a pair of smooth, variable speed driven rolls having a diameter of about 6 inches, and operating at a rate of about 35 feet per minute. A plasticized copolymer of about 73 weight percent of vinylidene chloride and 27 weight percent vinyl chloride was extruded as nearly as possible at a steady rate of 12 to 13 pounds per hour from an internally heated extruder operating at a cylinder temperature of about 160° C. utilizing a single flat film die heated to about 168° C. Such polymer was extruded through the die downwardly into a supercooling bath maintained at a temperature of about 25° C. The supercooled polymer film was drawn to a size of about .001 of an inch in thickness and a width of about 8.4 inches, and was then removed from the supercooling bath and deposited in the nip of the rolls mentioned above, as a protective layer on the polished surface of the steel sheet. Such super-cooled polymer film was essentially electrically neutral with respect to the surface of the steel sheet being protected. A roll pressure of about 10 pounds per square inch gauge was utilized to remove essentially all of the air from between the protective coating and the surface being protected. A laminated structure was thereby formed composed of a continuous and continuously adherent, essentially amorphous, flexible polymeric protective covering which was essentially electrically neutral with respect to the surface of such steel sheet and wherein substantially all of the air had been excluded from between the protective layer and the surface being protected. Such protective layer was found to be desirably adherent to the polished surface of the steel sheet both while in the amorphous form and after reaquiring its crystalline condition, even during deep-drawing and sharp bending manipulations of the protected sheet. The protective coating was, however, easily peeled from the surface of the steel sheet both before and following rewinding of such protected steel sheet, to provide a clean, unmarred, polished steel surface requiring no further treatment.

Similar good results were obtained utilizing the process as described above wherein polished aluminum sheet metal having a thickness of about 0.038 of an inch was utilized.

Equally good results were also obtained by the process as described above wherein essentially unoriented polyvinyl chloride was used as the protective layer for either the chrome-plated sheet steel or polished aluminum sheet metal. Slightly higher extruder and die temperatures of about 180° C. and 190° C. respectively, were used in these experiments.

*Example 2*

Figure 2:
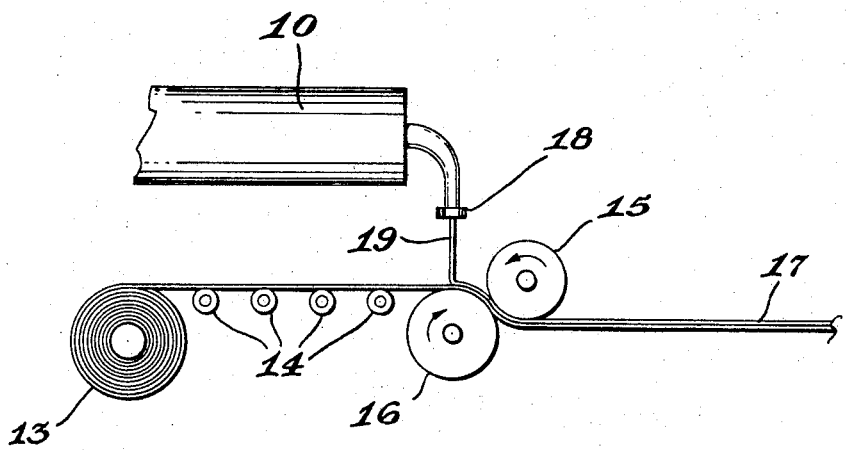
FIGURE 2 is a schematic view showing an alternate form of the embodiment.

The following results were obtained using apparatus essentially as illustrated in FIGURE 2 of the drawings.

In each of a series of experiments, a sheet of tin plated steel having a thickness of about 0.01 of an inch was fed through the nip of a pair of smooth, variable speed driven rolls as described in Example 1. Individual, molten, random copolymers of between about 90 and 97 weight percent ethylene and, complementarily, between about 10 and 3 weight percent acrylic acid, having a melt index of between about 3 and 13, were then separately and individually extruded as nearly as possible at a steady rate of about 37 pounds per hour from an internally heated extruder operating at a cylinder temperature of about 290° C. to 350° C., utilizing a single flat film die heated to about 315° C. Each molten polymer was separately deposited in the nip of the rolls mentioned above, as a protective layer, having a thickness of about 0.001 to 0.008 of an inch, on the polished surface of the steel sheet. In each of these experiments the metal sheet 13 was passed over a roll maintained at a temperature of about 56° C. just prior to being fed into the nip of the driven rolls mentioned above, with subsequent application of the protective coating.

A laminated structure was thereby formed, in each instance, composed of a continuous, adherent, essentially amorphous flexible polymeric protective covering on a steel sheet, having the desirable properties as previously described herein.

*Example 3*

A sheet of polished chrome-plated steel 0.01 inch thick and about nine inches wide having a finished surface was fed through the nip of a pair of smooth variable speed driven rollers having a diameter of about 6 inches and operating at a rate of about 15 feet per minute. An oriented sheet (prepared using standard bubble techniques and having a thickness of 1.35 mil.) composed of a copolymer of 73 percent by weight vinylidene chloride and 27 percent by weight vinyl chloride, and, additionally, formulated with about 8 percent by weight dibutyl sebacate as a plasticizer and 0.2 percent magnesium oxide; was fed into the nip of the rolls mentioned above, as a protective layer on the finished surface of the sheet metal. A laminated structure was thereby formed composed of a continuous, adherent, oriented polymeric protective covering on a steel sheet, wherein substantially all of the air had been excluded from between the protective layer and the surface being protected. Such protective layer was found to be desirably adherent to the finished surface of the steel sheet even during deep-drawing and sharp bending manipulations of the protected sheet. The protective coating was, however, easily peeled from the surface of the steel sheet before or after rewinding of such protected steel sheet, to provide a clean, unmarred, polished steel surface requiring no further treatment.

Similar good results were also obtained wherein the metal contacting surface of the herein described protective sheet was passed over a means for ionizing the air next to such surface (to remove any residual electrostatic charge from the surface of the sheet) prior to deposition to the finished metal surface at the nip of the pressure rolls.

Further, equally good results were obtained utilizing the processes as described above wherein polished aluminum sheet metal having a thickness of about 0.038 of an inch was utilized.

What is claimed is:

1. In the method of temporarily protecting a finished metallic surface with a synthetic, resinous, flexible sheet material, the improvement consisting of:
    (1) contacting a finished metallic surface with a synthetic, resinous, flexible sheet material selected from the group consisting of chloroethylene polymer and copolymers of between about 90 and 97 weight percent ethylene and between about 10 and 3 weight percent of a comonomer selected from the group consisting of acrylic acid, vinyl acetate and the lower acrylates which is essentially electrically neutral with respect to said finished metallic surface, and
    (2) applying said sheet material to said finished metallic surface under pressure sufficient to remove essentially all of the air between said sheet material and said finished metallic surfaces.

2. The method of claim 1 wherein said sheet material is a chloroethylene polymer.

3. The method of claim 2 wherein said chloroethylene polymer is polyvinyl chloride.

4. The method of claim 2 wherein said chloroethylene polymer is a copolymer of vinyl chloride and vinylidene chloride.

5. The method of claim 4 wherein said copolymer is a copolymer of about 73 weight percent vinylidene chloride and about 27 weight percent vinyl chloride.

6. The method of claim 1 wherein said flexible sheet material is a random copolymer of (a) between 90 and 97 weight percent ethylene and (b) complementarily, between about 10 and 3 weight percent of acrylic acid, said copolymer having a melt index of between about 3 and 13.

References Cited

UNITED STATES PATENTS

| | | | |
|---|---|---|---|
| 2,120,461 | 6/1938 | Copeman | 29—423 |
| 2,303,826 | 12/1942 | DeBell. | |
| 2,392,695 | 1/1946 | Rohdin | 156—289 |
| 2,393,887 | 8/1946 | Chamberlain | 88—113 |
| 2,679,969 | 6/1954 | Richter. | |
| 3,054,708 | 9/1962 | Steinberg | 156—272 X |
| 3,075,868 | 1/1963 | Long | 156—244 X |
| 3,191,286 | 6/1965 | Armstrong et al. | 29—424 |

EARL M. BERGERT, *Primary Examiner.*

J. P. MELOCHE, *Assistant Examiner.*